United States Patent
Ke et al.

(10) Patent No.: US 10,948,813 B2
(45) Date of Patent: Mar. 16, 2021

(54) PROJECTION SYSTEM, BEAM GENERATING APPARATUS THEREOF, AND BEAM GENERATING METHOD

(71) Applicant: Coretronic Corporation, Hsin-Chu (TW)

(72) Inventors: Chi-Wen Ke, Hsin-Chu (TW); Chi-Hung Chung, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 217 days.

(21) Appl. No.: 16/367,267

(22) Filed: Mar. 28, 2019

(65) Prior Publication Data
US 2019/0302599 A1 Oct. 3, 2019

(30) Foreign Application Priority Data
Mar. 30, 2018 (CN) .......................... 201810295707.8

(51) Int. Cl.
| | | |
|---|---|---|
| G03B 21/20 | (2006.01) | |
| H04N 9/31 | (2006.01) | |
| H05B 45/395 | (2020.01) | |
| H05B 45/10 | (2020.01) | |

(52) U.S. Cl.
CPC ....... *G03B 21/2053* (2013.01); *H04N 9/3155* (2013.01); *H05B 45/10* (2020.01); *H05B 45/395* (2020.01)

(58) Field of Classification Search
CPC ............ G03B 21/2053; G03B 21/2013; G03B 21/2033; H05B 45/395; H05B 45/37; H05B 45/10; H05B 45/00; H04N 9/3155; H04N 9/3164; H04N 9/3161

USPC .......................................................... 353/85
See application file for complete search history.

(56) References Cited

U.S. PATENT DOCUMENTS

| | | |
|---|---|---|
| 2006/0290625 A1 | 12/2006 | Sugimoto |
| 2008/0297058 A1 | 12/2008 | Soos |
| 2010/0066257 A1* | 3/2010 | Lin .................... H05B 45/46 315/161 |

(Continued)

FOREIGN PATENT DOCUMENTS

| | | |
|---|---|---|
| CN | 1707348 | 12/2005 |
| CN | 101176215 | 5/2008 |

(Continued)

OTHER PUBLICATIONS

"Office Action of China Counterpart Application", dated Dec. 14, 2020, p. 1-p. 10.

*Primary Examiner* — Ryan D Howard
(74) *Attorney, Agent, or Firm* — JCIPRNET

(57) ABSTRACT

A projection system, a beam generating apparatus, and a beam generating method are provided. The beam generating apparatus includes a plurality of light emitting devices, a plurality of drivers, and a first auxiliary driver. The light emitting devices respectively generate a plurality of color lights with different wavelengths. The drivers respectively drive the light emitting devices according to a plurality of control signals. The first auxiliary driver drives a first light emitting device according to a first auxiliary control signal, and adjusts brightness of the first light emitting device according to a first regulating signal. When the first auxiliary control signal is enabled, the control signal corresponding the first light emitting device is disabled.

24 Claims, 9 Drawing Sheets

(56) References Cited

U.S. PATENT DOCUMENTS

2015/0189713 A1   7/2015   Huang et al.

FOREIGN PATENT DOCUMENTS

| CN | 101256292 | 9/2008 |
| CN | 101778503 | 7/2010 |
| CN | 102118902 | 7/2011 |
| CN | 206209269 | 5/2017 |
| CN | 106940987 | 7/2017 |
| CN | 107567132 | 1/2018 |
| EP | 2611160 | 7/2013 |
| EP | 2993899 | 3/2016 |

* cited by examiner

PROJECTION SYSTEM, BEAM GENERATING APPARATUS THEREOF, AND BEAM GENERATING METHOD

CROSS-REFERENCE TO RELATED APPLICATION

This application claims the priority benefit of China application serial no. 201810295707.8, filed on Mar. 30, 2018. The entirety of the above-mentioned patent application is hereby incorporated by reference herein and made a part of this specification.

BACKGROUND OF THE INVENTION

1. Field of the Invention

The invention relates to a projection system, a beam generating apparatus of the projection system, and a beam generating method, and particularly relates to a beam generating apparatus and a beam generating method capable of increasing brightness of emitted light.

2. Description of Related Art

It is conventional to dispose a set of drivers in a beam generating apparatus of a projection system and use three channels to respectively generate beams of color light with three different wavelengths (e.g., red light, blue light, and green light). In the conventional art, the beam generating apparatus may achieve time division color-mixing by transmitting the beams of light with three different wavelengths in a time-dividing manner.

In the conventional art, the design of a controller needs to be modified significantly in order to increase the brightness of the light beams. In such circumstance, it may be difficult to provide brighter light beams in the conventional products. Thus, how to generate a brighter light beam by the beam generating apparatus of the projection system in a simple and low-cost way has become an important issue for designers to work on.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

Exemplary embodiments of the invention provide a projection system, a beam generating apparatus of the projection system, and a beam generating method capable of increasing the brightness of generated light beams.

Other objects and advantages of the invention can be further illustrated by the technical features broadly embodied and described as follows.

In order to achieve one or part or all of the objects or other objects, an embodiment of the invention provides a beam generating apparatus for a projection system. The beam generating apparatus includes a plurality of light emitting devices, a plurality of drivers, and a first auxiliary driver. The light emitting devices respectively generate color light with different wavelengths. The drivers are respectively serially coupled between the light emitting devices and a reference voltage and respectively drive the light emitting devices according to a plurality of control signals. A first auxiliary driver is serially coupled between a first light emitting device of the light emitting devices and the reference voltage, and drives the first light emitting device according to a first auxiliary control signal and adjusts brightness of the first light emitting device according to a first regulating signal. When the first auxiliary control signal is enabled, the control signal corresponding the first light emitting device is disabled.

In order to achieve one or part or all of the objects or other objects, an embodiment of the invention provides a projection system including a beam generating apparatus, a light valve, and a lens. The beam generating apparatus generates a source beam. The beam generating apparatus includes a plurality of light emitting devices, a plurality of drivers, and a first auxiliary driver. The light emitting devices respectively generate color light with different wavelengths. The drivers are respectively serially coupled between the light emitting devices and a reference voltage and respectively drive the light emitting devices according to a plurality of control signals. A first auxiliary driver is serially coupled between a first light emitting device of the light emitting devices and the reference voltage, and drives the first light emitting device according to a first auxiliary control signal and adjusts brightness of the first light emitting device according to a first regulating signal. When the first auxiliary control signal is enabled, the control signal corresponding the first light emitting device is disabled.

In order to achieve one or part or all of the objects or other objects, an embodiment of the invention provides a beam generating method. The beam generating method includes the following. A plurality of light emitting devices are provided to respectively generate color light with different wavelengths. A plurality of drivers are provided to respectively drive the light emitting devices according to a plurality of control signals. An auxiliary driver drives a first light emitting device of the light emitting devices according to an auxiliary control signal, and adjusts brightness of the first light emitting device according to a regulating signal. When the auxiliary control signal is enabled, the control signal corresponding the first light emitting device is disabled.

According to the above, the embodiments of the invention provide the auxiliary driver. Thus, when the corresponding driver stops driving the light emitting device, the auxiliary driver may provide the auxiliary control signal to light up the corresponding light emitting device. In addition, the auxiliary driver according to the embodiments of the invention may adjust the brightness of the light beam generated by the corresponding light emitting device according to the regulating signal, so as to facilitate the operation performance of the beam generating apparatus. In the embodiments of the invention, the brightness may be increased with the drivers under the original framework (i.e., no additional driver added).

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
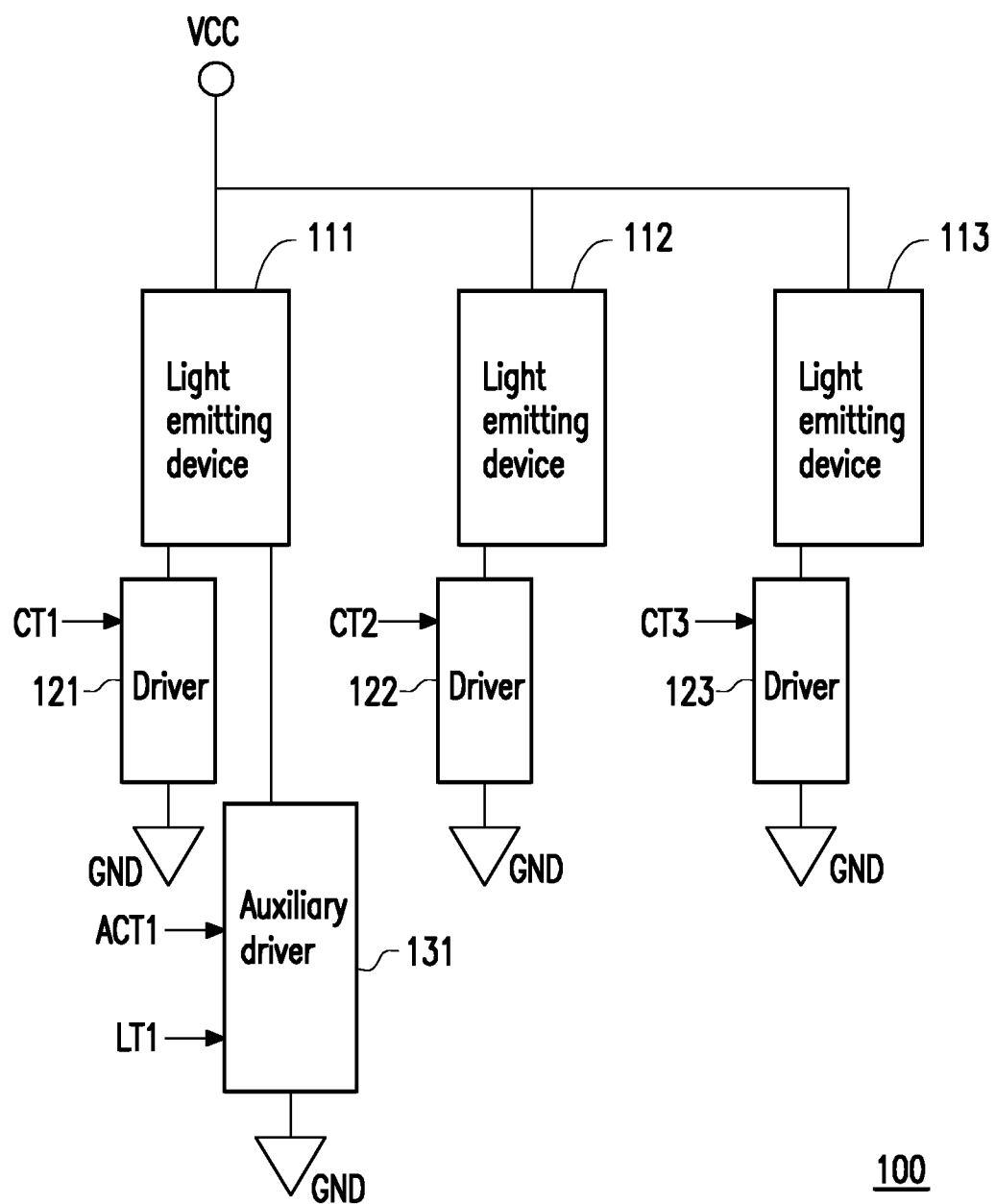
FIG. 1 is a schematic diagram illustrating a beam generating apparatus according to an embodiment of the invention.

Referring to FIG. 1, FIG. 1 is a schematic diagram illustrating a beam generating apparatus according to an embodiment of the invention. A beam generating apparatus 100 is applicable in a projection system. The beam generating apparatus 100 includes a plurality of light emitting devices 111, 112, and 113 (taking three light emitting devices as an example), a plurality of drivers 121, 122, and 123 (taking three drivers as an example), and an auxiliary driver 131. The light emitting devices 111 to 113 jointly receive a power voltage VCC, and are respectively coupled to the drivers 121 to 123. The drivers 121 to 123 are respectively serially coupled between the light emitting devices 111 to 113 and a reference voltage GND. The voltage value of the reference voltage GND may be less than the voltage value of the power voltage VCC. The drivers 121 to 123 respectively receive control signals CT1 to CT3, and respectively drive the light emitting devices 111 to 113 according to the control signals CT1 to CT3. In the embodiment, the drivers 121 to 123 between the light emitting devices 111 to 113 and the reference voltage GND respectively provide a plurality of driving currents to drive the light emitting devices 111 to 113 to generate beams. In the embodiment, the light emitting devices 111 to 113 may generate a plurality of color lights with a plurality of different wavelengths. For example, the light emitting devices 111, 112, and 113 may respectively generate beams of blue light, green light, and red light.

However, in other embodiments, the light emitting devices 111 to 113 may respectively generate light in different colors. The beams of blue light, green light, and red light are described above as an example, and shall not be construed as a limitation on the scope of the invention.

Besides, in the embodiment, the control signals CT1 to CT3 are periodical and enabled in a time-dividing manner. In addition, the control signals CT1 to CT3 are not enabled at the same time. In other words, according to the control signals CT1 to CT3, the drivers 121 to 123 supply the driving currents in a periodical and time-dividing manner.

In the embodiment, the auxiliary driver 131 is serially coupled between the light emitting device 111 and the reference voltage GND. The auxiliary driver 131 receives an auxiliary control signal ACT1 and a regulating signal LT1. According to the auxiliary control signal ACT1, the auxiliary driver 131 determines whether to provide a driving current between the light emitting device 111 and the reference voltage GND to drive the light emitting device 111 to generate a beam of color light. In addition, the auxiliary driver 131 may also adjust the magnitude of the driving current between the light emitting device 111 and the reference voltage GND according to the regulating signal LT1, so as to further adjust/control the brightness of the color light generated by the light emitting device 111.

In the embodiment, when the auxiliary control signal ACT1 is enabled, the auxiliary driver 131 may generate a driving current. Alternatively, when the auxiliary control signal ACT1 is disabled, the auxiliary driver 131 does not generate a driving current. In addition, when the beam generating apparatus 100 is under operation, enabled/disabled states of the auxiliary control signal ACT1 and the control signal CT1 received by the corresponding driver 121 are not consistent with each other. In other words, when the auxiliary control signal ACT1 is enabled, the control signal CT1 is disabled. To be more specific, when the auxiliary driver 131 is in a process of generating a driving current, the driver 121 does not generate a driving current. Alternatively, when the driver 121 is in a process of generating a driving current, the auxiliary driver 131 does not generate a driving current.

Besides, the enabled/disabled states of the auxiliary control signal ACT1 and the control signal CT1 may be identified according to voltage levels of the auxiliary control signal ACT1 and the control signal CT1. In the embodiment, taking the auxiliary control signal ACT1 as an example, when the auxiliary control signal ACT1 is at a first logic level, the auxiliary control signal ACT1 is enabled. Alternatively, when the auxiliary control signal ACT1 is at a second logic level, the auxiliary control signal ACT1 is disabled. In the following, the first logic level may be a logic-high level (or a logic-low level), whereas the second logic level may be a logic-low level (or a logic-high level).

Figure 2:
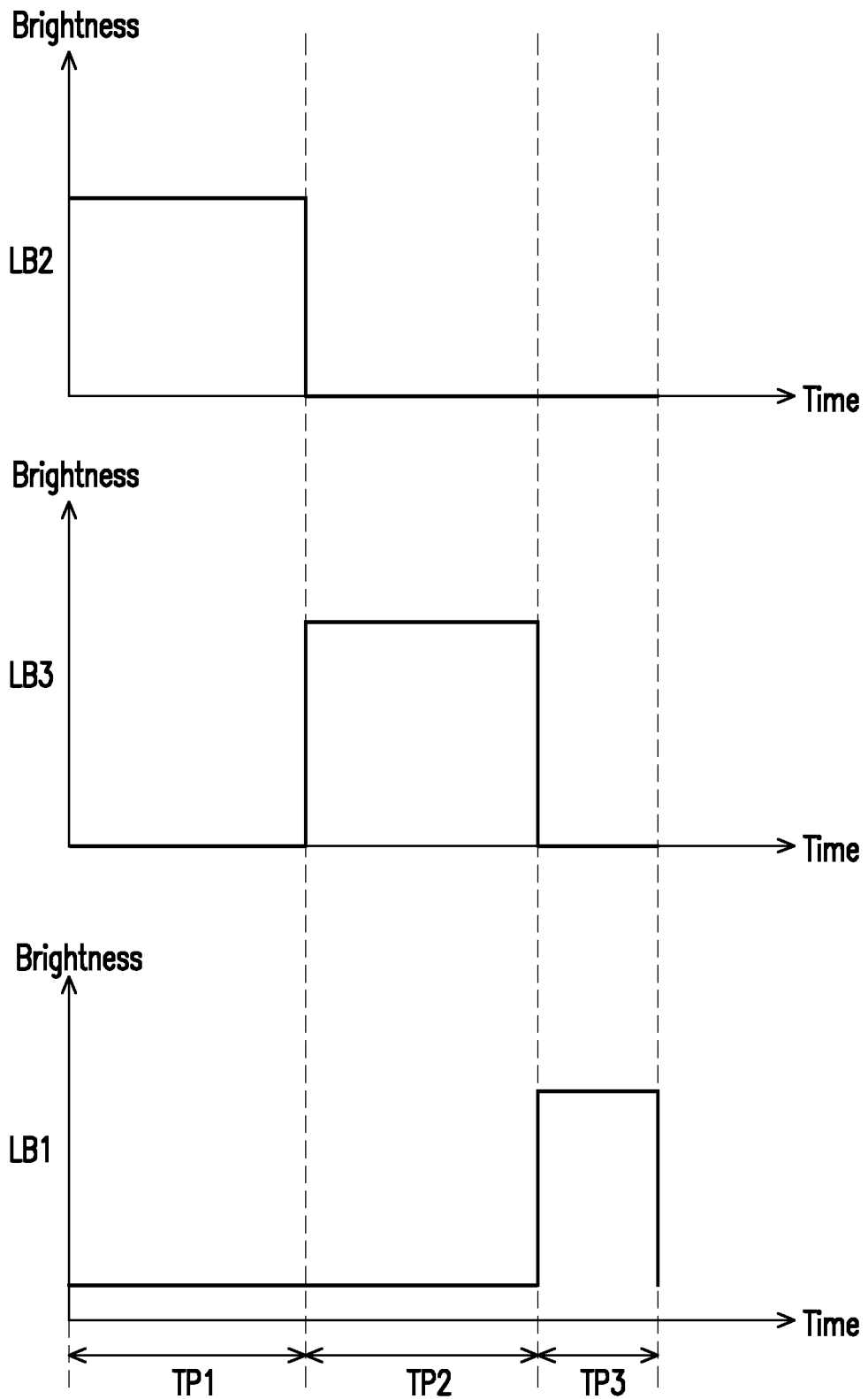
FIG. 2 is a diagram illustrating a temporal sequence of processes of a beam generating apparatus according to an embodiment of the invention.

Referring to FIGS. 1 and 2, FIG. 2 is a diagram illustrating a temporal sequence of processes of a beam generating apparatus according to an embodiment of the invention. In FIG. 2, waveforms LB1 to LB3 respectively represent brightness states of color lights generated by the light emitting devices 111 to 113. In the embodiment, during a time interval TP1, the driver 122 generates a driving current according to the control signal CT2 and drives the light emitting device 112 to generate color light as represented by the waveform LB2. In addition, during a time interval TP2, the driver 123 generates a driving current according to the control signal CT3 and drives the light emitting device 113 to generate color light as represented by the waveform LB3. In the embodiment, the light emitting device 113 does not generate color light during the time interval TP1, and the light emitting device 112 does not generate color light during the time interval TP2. However, during the time intervals TP1 and TP2, the auxiliary driver 131 generates a driving current according to the first auxiliary control signal ACT1 and drives the light emitting device 111 to generate color light as represented by the waveform LB1. In addition, during the time intervals TP1 and TP2, the brightness of the color light generated by the light emitting device 111 is lower than the brightness of the color light respectively generated by the light emitting device 112 and the light emitting device 113.

In the embodiment, during a time interval TP3, the driver 121 generates a driving current according to the control signal CT1 and drives the light emitting device 111 to generate color light as represented by the waveform LB1. In addition, during the time interval TP3, the drivers 122 and 123 and the auxiliary driver 131 are not operated, and the brightness of the color light generated by the light emitting device 111 during the time interval TP3 is higher than the brightness of the color light generated by the light emitting device 111 during the time intervals TP1 and TP2.

In the embodiment of FIG. 2, the brightness of the color light generated by the light emitting device 111 in the time interval TP1 is the same as the brightness of the color light generated by the light emitting device 111 in the time interval TP2, for example. However, in other embodiments, the brightness of the color light generated by the light emitting device 111 in the time interval TP1 may be different from the brightness of the color light generated by the light emitting device 111 in the time interval TP2. In addition, the time intervals TP1, TP2, and TP3 may be arranged continuously and periodically, and any two of the time intervals TP1, TP2, and TP3 do not overlap each other.

In the embodiment, the brightness of the color light generated by the light emitting device 111 in the time intervals TP1 and TP2 are adjustable. In the embodiment, the auxiliary driver 131 may adjust the magnitude of the driving current according to the regulating signal LT1, so as to further adjust the brightness of light generated by the light emitting device 111. Several embodiments of the auxiliary driver 131 are described in the examples below.

Figure 3A:
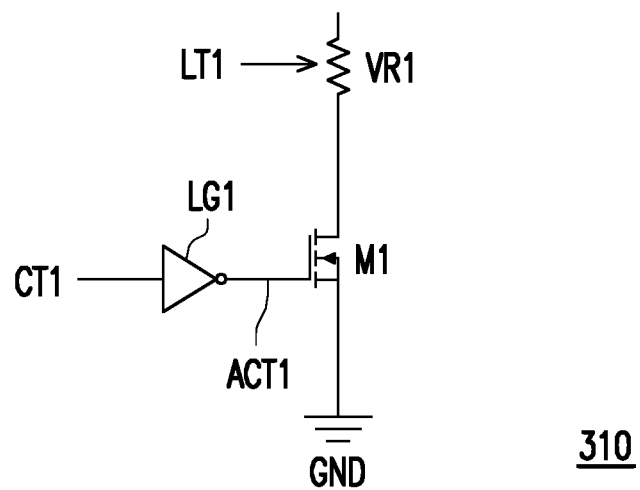
FIGS. 3A to 3D are circuit diagrams illustrating multiple different examples of an auxiliary driver according to the embodiments of the invention.

Referring to FIGS. 3A to 3D, FIGS. 3A to 3D are circuit diagrams illustrating multiple different examples of an auxiliary driver according to the embodiments of the invention. In FIG. 3A, an auxiliary driver 310 includes a transistor M1, a variable resistor VR1, and a logic circuit LG1. The transistor M1 is coupled between a light emitting device (e.g., the light emitting device 111) and the reference voltage GND, and is controlled by the auxiliary control signal ACT1. The variable resistor VR1 may be serially coupled with the transistor M1 between the light emitting device (e.g., the light emitting device 111) and the reference voltage GND. The variable resistor VR1 receives the regulating signal LT1 and changes a resistance value that the variable resistor VR1 provides according to the regulating signal LT1. The logic circuit LG1 is configured to generate the auxiliary control signal ACT1 according to the logic level of the control signal CT1 corresponding to the light emitting device (e.g., the light emitting device 111). In the embodiment, the logic circuit LG1 is an inverter and generates the auxiliary control signal ACT1 that is opposites to the control signal CT1 according to the control signal CT1.

Regarding the operation of the auxiliary driver 310, when the auxiliary control signal ACT1 is enabled (i.e., when the control signal CT1 is disabled), the auxiliary driver 310 may turn on the transistor M1 according to the enabled auxiliary control signal ACT1, and cause the transistor M1 to generate a driving current to make the corresponding light emitting device (e.g., the light emitting device 111) generate a beam of color light. The magnitude of a driving current may be determined according to the resistance value of the variable resistor VR1. By changing the regulating signal LT1, the brightness of the beam of color light generated by the light emitting device (e.g., the light emitting device 111) is controllable.

Figure 3B:
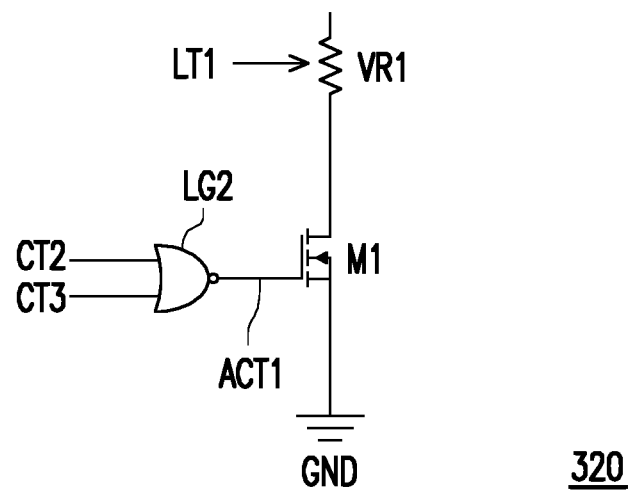

In FIG. 3B, differing from the embodiment of FIG. 3A, a logic circuit LG2 arranged as an NOR gate is disposed in an auxiliary driver 320. The logic circuit LG2 receives the control signals CT2 and CT3. When one of the control signals CT2 and CT3 is enabled, the logic circuit LG2 may generate the enabled auxiliary control signal ACT1 to turn on the transistor M1 and thereby generate a driving current. However, in other embodiments, the variable resistor VR1 in FIGS. 3A and 3B may be replaced by a resistor having a fixed resistance value.

Figure 3C:
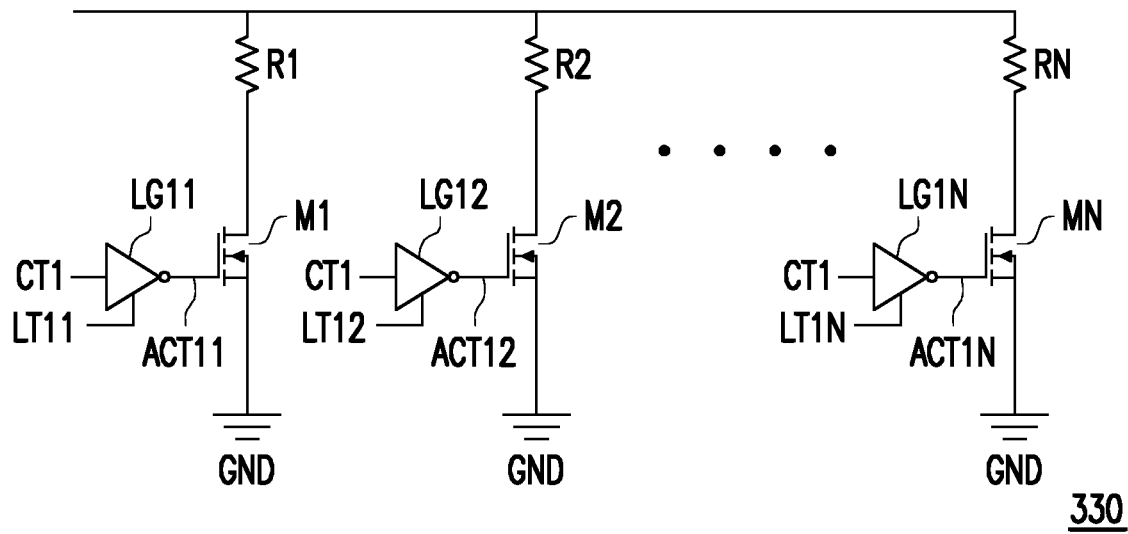

In FIG. 3C, an auxiliary driver 330 includes transistors M1 to MN, logic circuits LG11 to LG1N, and a plurality of resistors R1 to RN. The resistors R1 to RN are jointly coupled to a corresponding light emitting device (e.g., the light emitting device 111), and are respectively coupled to the transistors M1 to MN. The transistors M1 to MN are coupled in parallel with each other between the resistors R1 to RN and the reference voltage GND. The logic circuits LG11 to LG1N are respectively coupled to control ends of the transistors M1 to MN to respectively receive a plurality of bits LT11 to LT1N of the regulating signal and jointly receive the control signal CT1.

According to the above, the logic circuits LG11 to LG1N respectively determine voltage levels of generated auxiliary control signals ACT11 to ACT1N according to the bits LT11 to LT1N of the regulating signal. Taking the logic circuit LG11 as an example, when the control signal CT1 received by the logic circuit LG11 is in a disabled state, and the bit LT1 of the received regulating signal is in an enabled state, the logic circuit LG11 may output the auxiliary control signal ACT11 in an enabled state and correspondingly turn on (referring to allowing passing of a current here) the transistor M1. In such state, the transistor M1 may provide a driving current to drive the corresponding light emitting device (e.g., the light emitting device 111). Comparatively, when the control signal CT1 received by the logic circuit LG11 is in an enabled state, or when the bit LT1 of the received regulating signal is in a disabled state, the logic circuit LG11 may output the auxiliary control signal ACT11 corresponding to a disabled state and correspondingly cut off (referring to avoiding passing of a current here) the transistor M1.

According to the above, when the control signal CT1 is in the disabled state, the number of transistors for generating driving currents among the transistors M1 to MN may be controlled by controlling the numbers of enabled bits of the bits LT11 to LT1N of the regulating signal. Specifically, the magnitude of a driving current generated by the auxiliary driver 330 may be controlled according to the number of enabled bits of the bits LT11 to LT1N, so as to adjust the brightness of the beam of color light generated by the light emitting device (e.g., the light emitting device 111).

Also, channel sizes of the transistors M1 to MN may affect the magnitude of the driving current generated accordingly. In the embodiment, the channels of the transistors M1 to MN may all have the same width-to-length ratio or all have different width-to-length ratios, or the channels of a part of the transistors M1 to MN have the same width-to-length ratio but some of the transistors M1 to MN have different width-to-length ratios. Taking the case where the transistors M1 to MN all have the same width-to-length ratio as an example, the transistors M1 to MN may provide substantially the same driving currents. Accordingly, according to the number of enabled transistors among the transistors M1 to MN, the current value of the driving current provided by the auxiliary driver 330 may be obtained through calculation. Taking the case where the transistors M1 to MN all have different width-to-length ratios as another example, a driving current having a greater range of current value may be generated by arranging the width-to-length ratios of the transistors M1 to MN proportionally (e.g., 1:2:4 . . . ) and choosing to turn on one or more of the transistors M1 to MN.

Figure 3D:
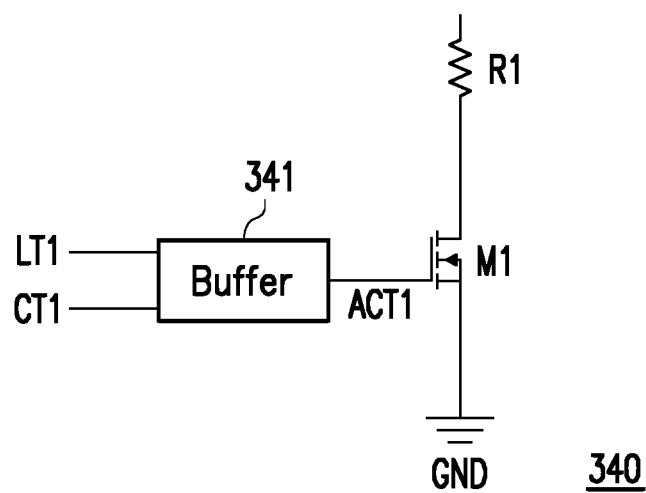

In FIG. 3D, the auxiliary driver 340 includes a buffer 341, the resistor R1, and the transistor M1. The buffer 341 receives the control signal CT1 and the regulating signal LT1, and generates the auxiliary control signal ACT1 according to the control signal CT1 and the regulating signal LT1. The transistor M1 and the resistor R1 are serially coupled between the corresponding light emitting device (e.g., the light emitting device 111) and the reference voltage GND. A control end of the transistor M1 receives the auxiliary control signal ACT1, and provides a driving current according to the auxiliary control signal ACT1.

According to the above, in the embodiment, the transistor M1 may be operated in a linear region, and may linearly adjust the magnitude of the driving current that the transistor M1 provides according to the size of the control signal ACT1. Correspondingly, the buffer 341 may generate the auxiliary control signal ACT1, which is an analog signal, according to the control signal CT1 and the regulating signal LT1. In addition, when the control signal CT1 is at a relatively high logic-high level, the auxiliary control signal ACT1 generated by the buffer 341 may allow the transistor M1 to be operated at a cut-off region and stop outputting of the driving current.

Figure 4A:
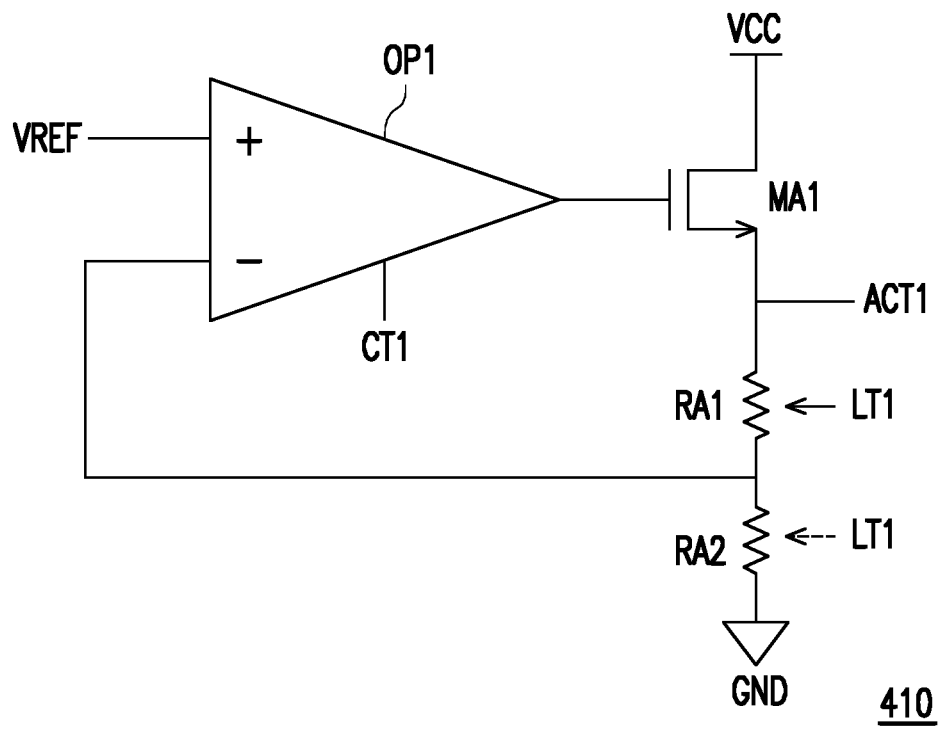
FIGS. 4A and 4B are respectively schematic diagrams illustrating multiple examples of a buffer according to the embodiments of the invention.
Figure 4B:
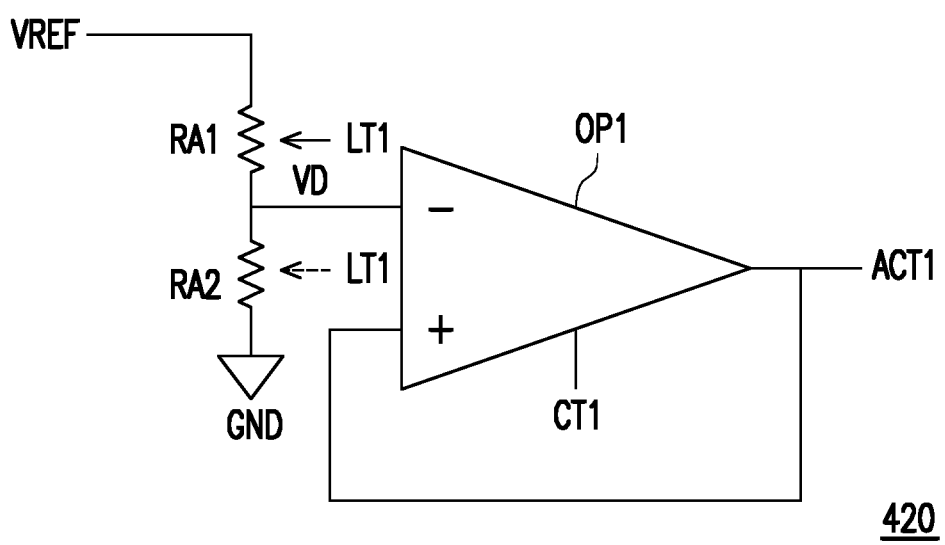

Referring to FIGS. 4A and 4B, FIGS. 4A and 4B are respectively schematic diagrams illustrating multiple examples of a buffer according to the embodiments of the invention. Referring to FIG. 4A, a buffer 410 includes a voltage regulator formed by a transistor MA1, resistors RA1 and RA2, and an operational amplifier OP1. The buffer 410 is a low drop-out (LDO) voltage regulator. In the embodiment, a positive input end of the operational amplifier OP1 receives a reference voltage VREF, a negative input end of the operational amplifier OP1 is coupled to a connection point of the resistors RA1 and RA2, and an output end of the operational amplifier OP1 is coupled to a control end of the transistor MA1. In addition, the operational amplifier OP1 receives the control signal CT1 and determines whether to carry out an operation according to the control signal CT1. A first end of the transistor MA1 receives the power voltage VCC, a second end of the transistor MA1 is coupled to the resistor RA1 and generates the auxiliary control signal ACT1.

Referring to FIG. 4A, the regulating signal LT1 is configured to adjust a resistance value of the resistor RA1 or the resistor RA2, and adjust a voltage dividing ratio of a resistor string formed by the resistors RA1 and RA2. By adjusting the voltage dividing ratio, the voltage value of the auxiliary control signal ACT1 may be adjusted.

Referring to FIGS. 1 and 4A, regarding the operation, when the buffer 410 receives the enabled control signal CT1, the operational amplifier OP1 is disabled according to the enabled control signal CT1, and the transistor MA1 is cut off. Under the circumstance, the voltage value of the auxiliary control signal ACT1 is equal to the reference voltage GND (e.g., 0V), and the auxiliary driver 131 does not provide a driving current. Comparatively, when the buffer 410 receives the disabled control signal CT1, the operational amplifier OP1 is started according to the disabled control signal CT1. According to the reference voltage VREF and the voltage dividing ratio of the resistor string formed by the resistors RA1 and RA2, the operational amplifier OP1 may generate the auxiliary control signal ACT1. By adjusting the voltage value of the auxiliary control signal ACT1, the current value of the driving current provided by the auxiliary driver 131 may be adjusted.

Besides, in FIG. 4B, a buffer 420 includes a voltage divider formed by the operational amplifier OP1 and the resistors RA1 and RA2. The operational amplifier OP1 is coupled in a configuration of a voltage follower. The input end of the operational amplifier OP1 receives a divided voltage VD provided by the voltage divider formed by the resistors RA1 and RA2, and receives the control signal CT1, so as to be disabled or enabled. The resistors RA1 and RA2 are serially connected between the reference voltage VREF and the reference voltage GND. In the embodiment, the resistance value of the resistor RA1 or the resistor RA2 may be adjusted according to the regulating signal LT1. Accordingly, the voltage dividing ratio formed by the resistor RA1 or the resistor RA2 may be adjusted according to the regulating signal LT1.

Referring to FIGS. 1 and 4B, regarding the operation, when the control signal CT1 is enabled, the operational amplifier OP1 is disabled and not operated. In addition, the operational amplifier OP1 may provide the driving signal ACT1 with a low voltage (e.g., a voltage equal to the reference voltage GND). Under the circumstance, the auxiliary driver 131 does not generate a driving current. Alternatively, when the control signal CT1 is disabled, the operational amplifier OP1 is enabled and receives the divided voltage VD. Accordingly, the output end of the operational amplifier OP1 may provide the auxiliary driving signal ACT1, and a voltage value of the auxiliary driving signal ACT1 is equal to a voltage value of the divided voltage VD. Under the circumstance, the auxiliary driver 131 may adjust the magnitude of the driving current according to the voltage value of the auxiliary driving signal ACT1.

Figure 5:
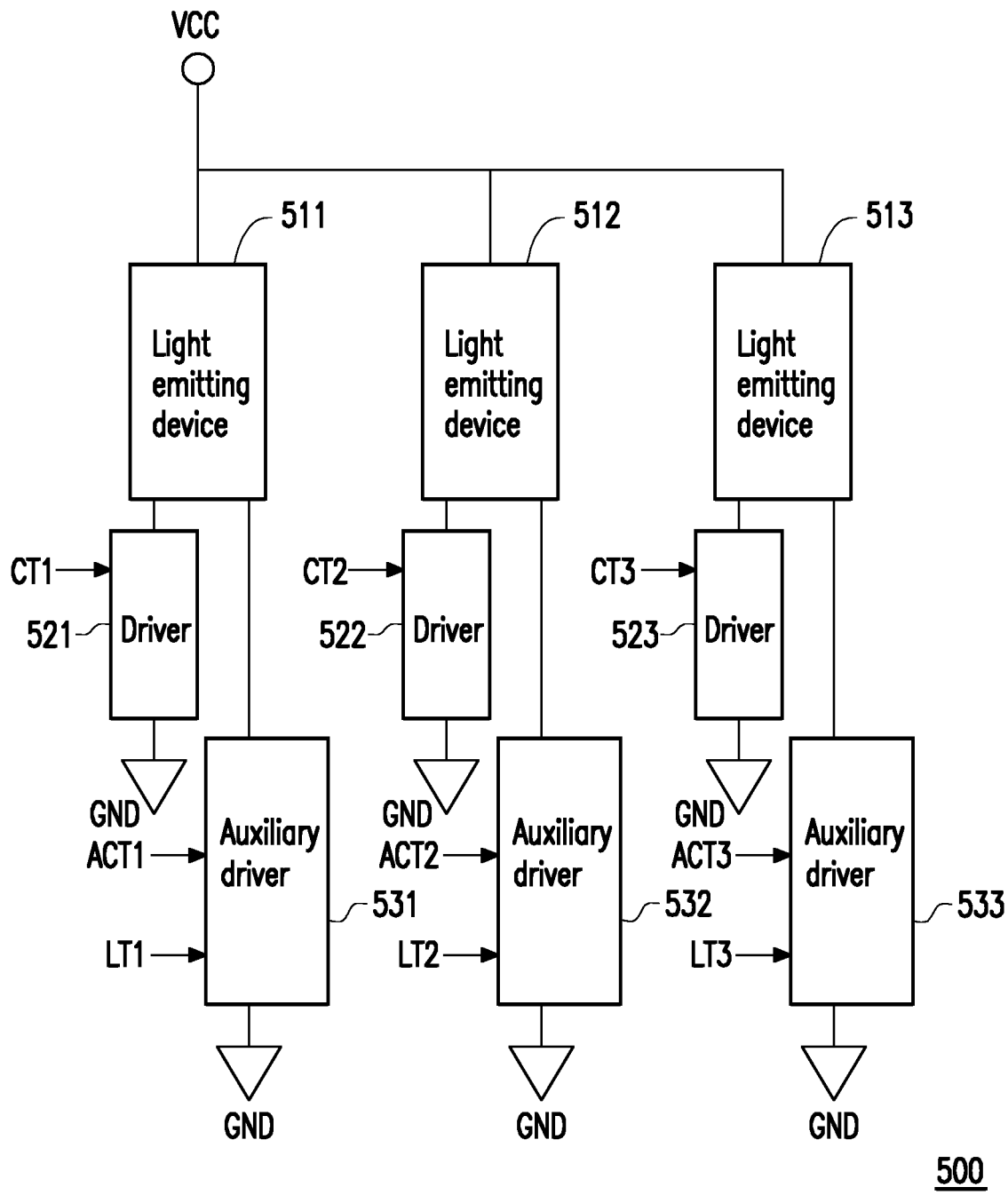
FIG. 5 is a schematic diagram illustrating a beam generating apparatus according to another embodiment of the invention.

Referring to FIG. 5, FIG. 5 is a schematic diagram illustrating a beam generating apparatus according to another embodiment of the invention. A beam generating apparatus 500 includes light emitting devices 511 to 513, drivers 521 and 523, and auxiliary drivers 531 to 533. What the embodiment differs from the embodiment of FIG. 1 is that, the auxiliary drivers 531 to 533 are disposed in correspondence with the respective light emitting devices 511 to 513, and the auxiliary drivers 531 to 533 may increase the brightness of beams of color light generated by the light emitting devices 511 to 513. Accordingly, the beam generation performance may be further facilitated, and the quality of the image projected by the projection system may be improved.

Of course, in other embodiments, a different number of the auxiliary drivers may be disposed to increase the brightness of beams. The embodiments illustrated in FIGS. 1 and 5 are merely examples described for an illustrative purpose, and shall not be construed as limitations on the scope of the invention.

Figure 6:
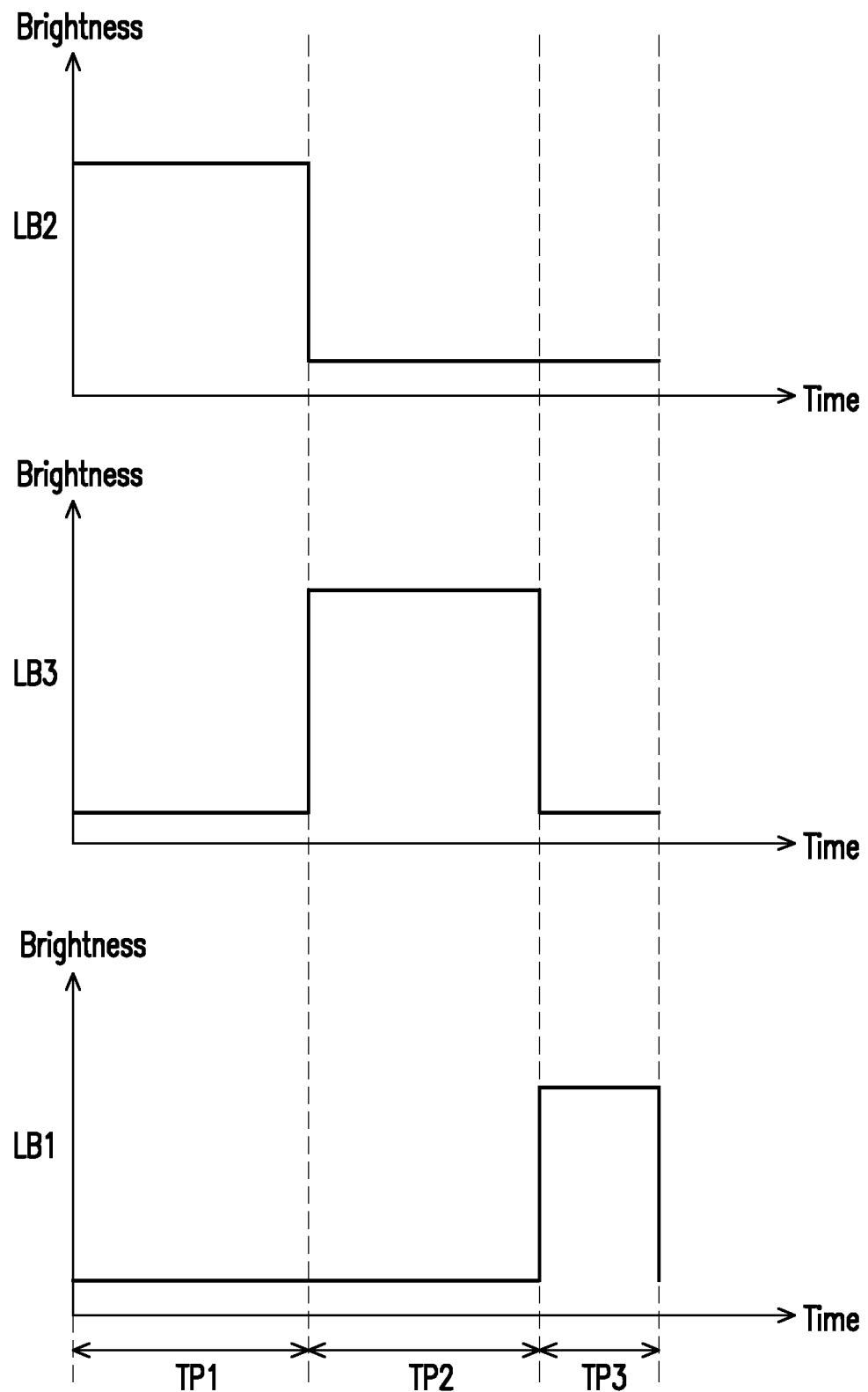
FIG. 6 is a diagram illustrating a temporal sequence of processes of the beam generating apparatus according to the embodiment shown in FIG. 5 of the invention.

Referring to FIG. 6, FIG. 6 is a diagram illustrating a temporal sequence of processes of the beam generating apparatus according to the embodiment shown in FIG. 5 of the invention. In FIG. 6, the waveforms LB1 to LB3 respectively represent brightness states of color light generated by the light emitting devices 511 to 513. In the embodiment, during the time interval TP1, a driver 522 generates a driving current according to the control signal CT2, and makes that the light emitting device 512 generates the color light having relatively high brightness. In the time intervals TP2 and TP3, the auxiliary driver 532 generates a driving current according to the auxiliary control signal ACT2, and makes that the light emitting device 512 generates the color light having relatively low brightness.

Regarding the light emitting device 513, during the time interval TP2, the driver 523 generates a driving current according to the control signal CT3, and makes that the light emitting device 513 generates the color light having relatively high brightness. In the time intervals TP1 and TP3, the auxiliary driver 533 generates a driving current according to the auxiliary control signal ACT3, and makes that the light emitting device 513 generates the color light having relatively low brightness. Also, regarding the light emitting device 511, during the time interval TP3, the driver 521 generates a driving current according to the control signal CT1, and makes that the light emitting device 511 generates the color light having relatively high brightness. In the time intervals TP1 and TP2, the auxiliary driver 531 generates a driving current according to the auxiliary control signal ACT1, and makes the light emitting device 511 generate color light having relatively low brightness.

Figure 7:
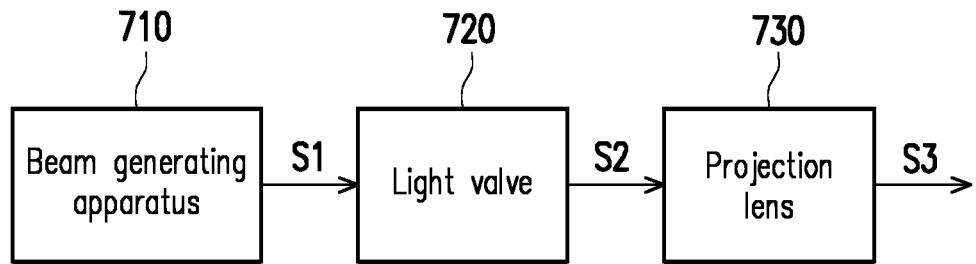
FIG. 7 is a schematic diagram illustrating a projection system according to an embodiment of the invention.

Referring to FIG. 7, FIG. 7 is a schematic diagram illustrating a projection system according to an embodiment of the invention. A projection system 700 includes a beam generating apparatus 710, a light valve 720, and a projection lens 730. The beam generating apparatus 710 is configured to provide a source beam S1. The light valve 720 is located on a transmission path of the source beam S1 and converts the source beam S1 into an image beam S2. The projection lens 730 is disposed on a transmission path of the image beam S2. In the embodiment, the image beam S2 passes through the projection lens 730 to form a projection beam S3. In the embodiment, the light valve 720 is a digital micromirror device (DMD), a liquid crystal on silicon (LCoS) panel, or a liquid crystal display (LCD) panel, for example. However, the invention is not limited thereto.

In the embodiment, the beam generating apparatus 710 may be implemented according to the beam generating apparatus 100 or the beam generating apparatus 500, and the color light generated in the light emitting devices in the beam generating apparatus 100 or the beam generating apparatus 500 may serve as the source beam S1.

Figure 8:
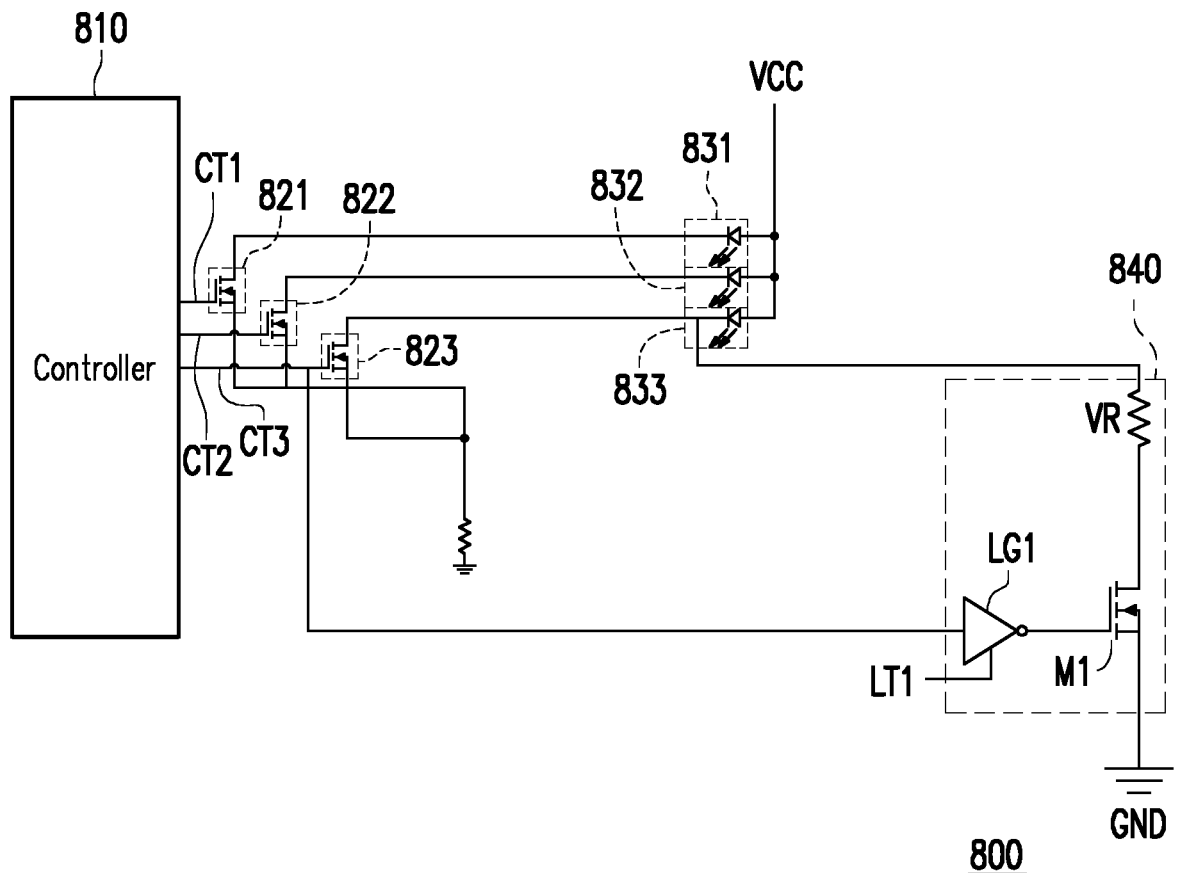
FIG. 8 is a schematic diagram illustrating a beam generating apparatus according to yet another embodiment of the invention.

Referring to FIG. 8, FIG. 8 is a schematic diagram illustrating a beam generating apparatus according to yet another embodiment of the invention. A beam generating apparatus 800 includes a controller 810, drivers 821 to 823, light emitting devices 831 to 833, and an auxiliary driver 840. In the embodiment, the controller 810 may be configured to generate the control signals CT1 to CT3, the auxiliary driving signal ACT1, and the regulating signal LT1. The drivers 821 to 823 are formed by transistors, and the light emitting devices 831 and 833 are all formed by light emitting diodes. In the embodiment, the auxiliary driver 840 includes a variable resistor VR, the logic circuit LG1, and the transistor M1.

The hardware framework of the controller 810 of the embodiment may be a processor having a computing capability or a hardware circuit designed according to the hardware description language (HDL) or any other methods for designing a digital circuit that people having ordinary skills in the art are familiar with and implemented as a field programmable gate array (FPGA), a complex programmable logic device (CPLLD), or an application-specific integrated circuit (ASIC). Besides, in other embodiments, the variable resistor VR may be replaced by a resistor having a fixed resistance value.

Details of the operation of the beam generating apparatus 800 are similar to those of the beam generating apparatus 100 of the foregoing embodiment, and thus will not be described in the following.

Figure 9:
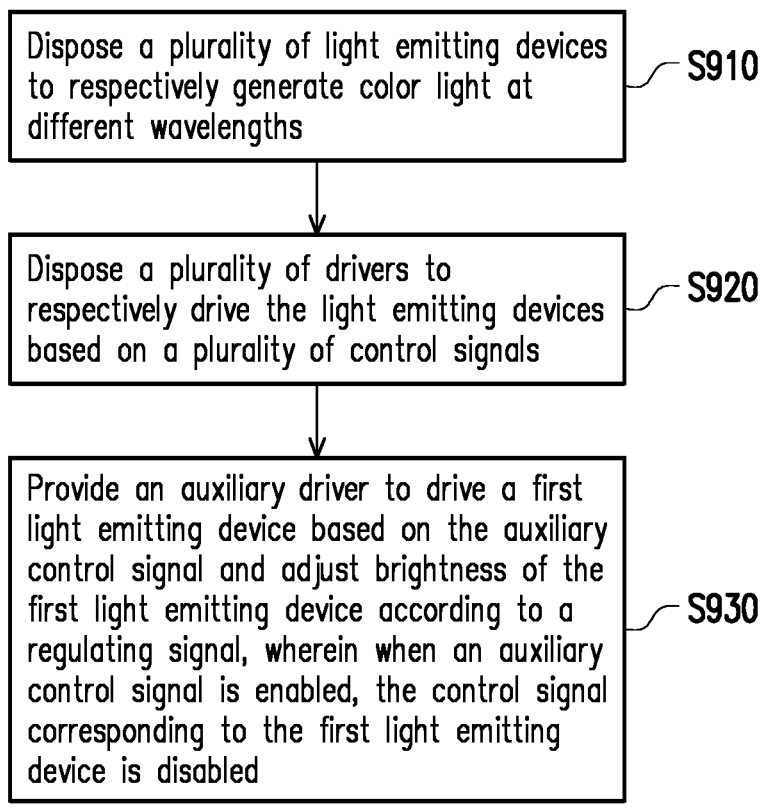
FIG. 9 is a flowchart illustrating a beam generating method according to an embodiment of the invention.

Referring to FIG. 9, FIG. 9 is a flowchart illustrating a beam generating method according to an embodiment of the invention. At Step S910, a plurality of light emitting devices respectively generating a plurality of color lights with different wavelengths is disposed/provided. At Step S910, a plurality of drivers respectively driving the light emitting devices according to a plurality of control signals is disposed/provided. At Step S930, an auxiliary driver is provided to drive a first light emitting device of the light emitting devices according to an auxiliary control signal and adjust brightness of the first light emitting device according to a regulating signal. In addition, when the auxiliary control signal is enabled, the control signal corresponding to the first light emitting device is disabled.

The steps of the embodiment are already described in detail in several embodiments and examples of the invention. Therefore, details in this regard will not be reiterated in the following.

In view of the foregoing, the auxiliary driver is provided in the embodiments of the invention. Therefore, in a time interval where the driver corresponding to the light emitting device does not provide a driving current, the auxiliary driver may generate the driving current, so as to facilitate the brightness of the light generated by the light emitting device and improve the performance of the beam generating apparatus. In the embodiments of the invention, the brightness may be increased with the drivers under the original framework (i.e., no additional driver added).

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A beam generating apparatus for a projection system, the beam generating apparatus comprising:
   a plurality of light emitting devices, respectively generating a plurality of color lights with different wavelengths;
   a plurality of drivers, respectively serially coupled between the light emitting devices and a reference voltage, wherein the drivers respectively drive the light emitting devices according to a plurality of control signals; and
   a first auxiliary driver, serially coupled between a first light emitting device of the light emitting devices and the reference voltage, and driving the first light emitting device according to a first auxiliary control signal and adjusting brightness of the first light emitting device according to a first regulating signal,
   wherein when the first auxiliary control signal is enabled, the control signal corresponding to the first light emitting device is disabled.

2. The beam generating apparatus as claimed in claim 1, wherein the first auxiliary driver comprises:
   a transistor, coupled between the first light emitting device and the reference voltage and controlled by the first auxiliary control signal;
   a variable resistor, serially coupled with the transistor between the first light emitting device and the reference voltage; and
   a logic circuit, generating the first auxiliary control signal according to a logic level of the control signal corresponding to the first light emitting device,
   wherein a resistance value of the variable resistor is determined according to the first regulating signal.

3. The beam generating apparatus as claimed in claim 1, wherein the first auxiliary driver comprises:
   a plurality of transistors, coupled in parallel with each other between the first light emitting device and the reference voltage and controlled by the first auxiliary control signal; and
   a plurality of logic circuits, respectively coupled to the transistors and generating the first auxiliary control signal according to a logic level of the control signal corresponding to the first light emitting device, and respectively disabled or enabled according to a plurality of bits of the first regulating signal.

4. The beam generating apparatus as claimed in claim 3, wherein all the width-to-length ratios of channels of the transistors are the same or different, or the channels of a part of the transistors have same width-to-length ratio.

5. The beam generating apparatus as claimed in claim 3, wherein the first auxiliary driver further comprises:
   a plurality of resistors, respectively serially coupled between the transistors and the first light emitting device.

6. The beam generating apparatus as claimed in claim 5, wherein the resistors are variable resistors.

7. The beam generating apparatus as claimed in claim 1, wherein the first auxiliary driver comprises:
   a transistor, coupled between the first light emitting device and the reference voltage and controlled by the first auxiliary control signal; and
   a buffer, coupled to the transistor and generating the first auxiliary control signal according to the control signal corresponding to the first light emitting device and the first regulating signal,
   wherein the transistor adjusts a current value of a current flowing through the first light emitting device according to the first auxiliary control signal.

8. The beam generating apparatus as claimed in claim 7, wherein the buffer comprises:
   a voltage regulator, generating the first auxiliary control signal according to a voltage value of the reference voltage,
   wherein the voltage regulator determines a voltage value of the first auxiliary control signal according to the first regulating signal.

9. The beam generating apparatus as claimed in claim 7, wherein the buffer comprises:
   a voltage divider, dividing the reference voltage to generate a divided voltage, wherein a voltage dividing ratio of the voltage divider is determined according to the first regulating signal; and
   a voltage follower, receiving the divided voltage, and generating the first auxiliary control signal according to the control signal corresponding to the first light emitting device and the divided voltage.

10. The beam generating apparatus as claimed in claim 1, further comprising:
    at least one second auxiliary driver, serially coupled between at least one second light emitting device of the light emitting devices and the reference voltage, driving the at least one second light emitting device according to at least one second auxiliary control signal, and adjusting brightness of the at least one second light emitting device according to at least one second regulating signal.

11. The beam generating apparatus as claimed in claim 1, wherein brightness generated by the first light emitting device according to the corresponding control signal is higher than brightness generated according to the first auxiliary control signal.

12. A projection system comprising:
a beam generating apparatus, adapted to transmit a source beam, and the beam generating apparatus comprising:
a plurality of light emitting devices, respectively generating a plurality of color lights with different wavelengths;
a plurality of drivers, respectively serially coupled between the light emitting devices and a reference voltage, and respectively driving the light emitting devices according to a plurality of control signals; and
a first auxiliary driver, serially coupled between a first light emitting device of the light emitting devices and the reference voltage, driving the first light emitting device according to the first auxiliary control signal, and adjusting brightness of the first light emitting device according to a first regulating signal,
wherein when the first auxiliary control signal is enabled, the control signal corresponding to the first light emitting device is disabled;
a light valve, receiving the source beam and converting the source beam into an image beam; and
a projection lens, adapted to receive the image beam.

13. The projection system as claimed in claim 12, wherein the first auxiliary driver comprises:
a transistor, coupled between the first light emitting device and the reference voltage and controlled by the first auxiliary control signal;
a variable resistor, serially coupled with the transistor between the first light emitting device and the reference voltage; and
a logic circuit, generating the first auxiliary control signal according to a logic level of the control signal corresponding to the first light emitting device,
wherein a resistance value of the variable resistor is determined according to the first regulating signal.

14. The projection system as claimed in claim 12, wherein the first auxiliary driver comprises:
a plurality of transistors, coupled in parallel with each other between the first light emitting device and the reference voltage and controlled by the first auxiliary control signal; and
a plurality of logic circuits, respectively coupled to the transistors and generating the first auxiliary control signal according to a logic level of the control signal corresponding to the first light emitting device, and respectively disabled or enabled according to a plurality of bits of the first regulating signal.

15. The projection system as claimed in claim 14, wherein all the width-to-length ratios of channels of the transistors are the same or different, or the channels of a part of the transistors have same width-to-length ratio.

16. The projection system as claimed in claim 14, wherein the first auxiliary driver further comprises:
a plurality of resistors, respectively serially coupled between the transistors and the first light emitting device.

17. The projection system as claimed in claim 16, wherein the resistors are variable resistors.

18. The projection system as claimed in claim 12, wherein the first auxiliary driver comprises:
a transistor, coupled between the first light emitting device and the reference voltage and controlled by the first auxiliary control signal; and
a buffer, coupled to the transistor and generating the first auxiliary control signal according to the control signal corresponding to the first light emitting device and the first regulating signal,
wherein the transistor adjusts a current value of a current flowing through the first light emitting device according to the first auxiliary control signal.

19. The projection system as claimed in claim 18, wherein the buffer comprises:
a voltage regulator, generating the first auxiliary control signal according to a voltage value of the reference voltage,
wherein the voltage regulator determines a voltage value of the first auxiliary control signal according to the first regulating signal.

20. The projection system as claimed in claim 18, wherein the buffer comprises:
a voltage divider, dividing the reference voltage to generate a divided voltage, wherein a voltage dividing ratio of the voltage divider is determined according to the first regulating signal; and
a voltage follower, receiving the divided voltage, and generating the first auxiliary control signal according to the control signal corresponding to the first light emitting device and the divided voltage.

21. The projection system as claimed in claim 12, wherein the beam generating apparatus further comprises:
at least one second auxiliary driver, serially coupled between at least one second light emitting device of the light emitting devices and the reference voltage, driving the at least one second light emitting device according to at least one second auxiliary control signal, and adjusting brightness of the at least one second light emitting device according to at least one second regulating signal.

22. The projection system as claimed in claim 12, wherein brightness generated by the first light emitting device according to the corresponding control signal is higher than brightness generated according to the first auxiliary control signal.

23. A beam generating method, comprising:
providing a plurality of light emitting devices to respectively generate a plurality of color lights with different wavelengths;
providing a plurality of drivers to respectively drive the light emitting devices according to a plurality of control signals; and
providing an auxiliary driver, driving a first light emitting device of the light emitting devices according to an auxiliary control signal, and adjusting brightness of the first light emitting device according to a regulating signal,
wherein when the auxiliary control signal is enabled, the control signal corresponding the first light emitting device is disabled.

24. The beam generating method as claimed in claim 23, wherein brightness generated by the first light emitting device according to the corresponding control signal is higher than brightness generated according to the auxiliary control signal.

\* \* \* \* \*